L. L. Woodmansee,
Bridle.

Nº 60,980.        Patented Jan. 1, 1867.

Witnesses.
J. H. Baggott
Jno. C. Baggott

Inventor.
L. L. Woodmansee

United States Patent Office.

LORENZO D. WOODMANSEE, OF MADRIVER TOWNSHIP, OHIO.

Letters Patent No. 60,980, dated January 1, 1867.

IMPROVED BRIDLE-BIT.

The Schedule referred to in these Letters Patent and making part of the same.

TO ALL WHOM IT MAY CONCERN:

Be it known that I, LORENZO D. WOODMANSEE, of Dayton, in Montgomery county, Ohio, have invented a new and useful improvement in Bridle-Bits; and I do hereby declare that the following is a full and exact description thereof, reference being had to the accompanying drawings, and to the letters of reference marked thereon.

Figure 2:
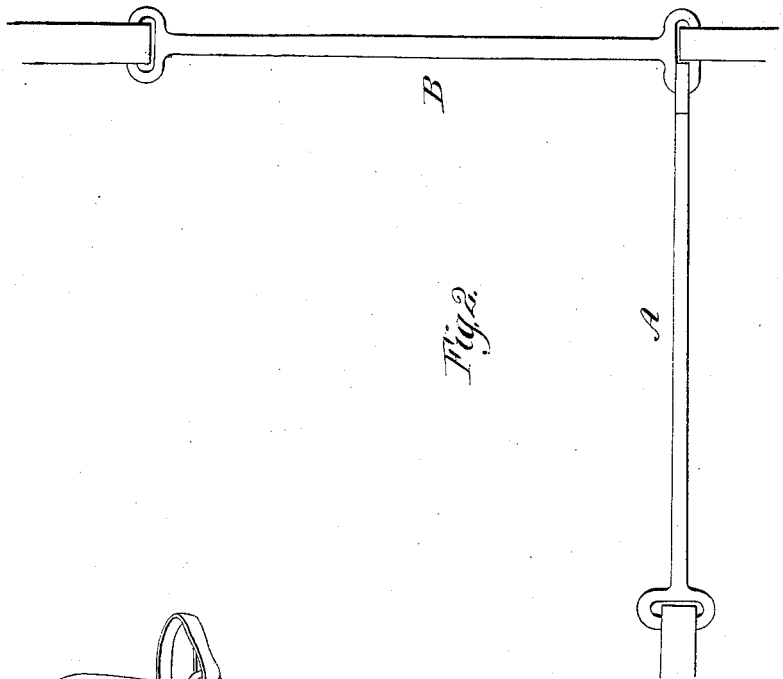
Figure 2 is a detached view of same.
Figure 1:
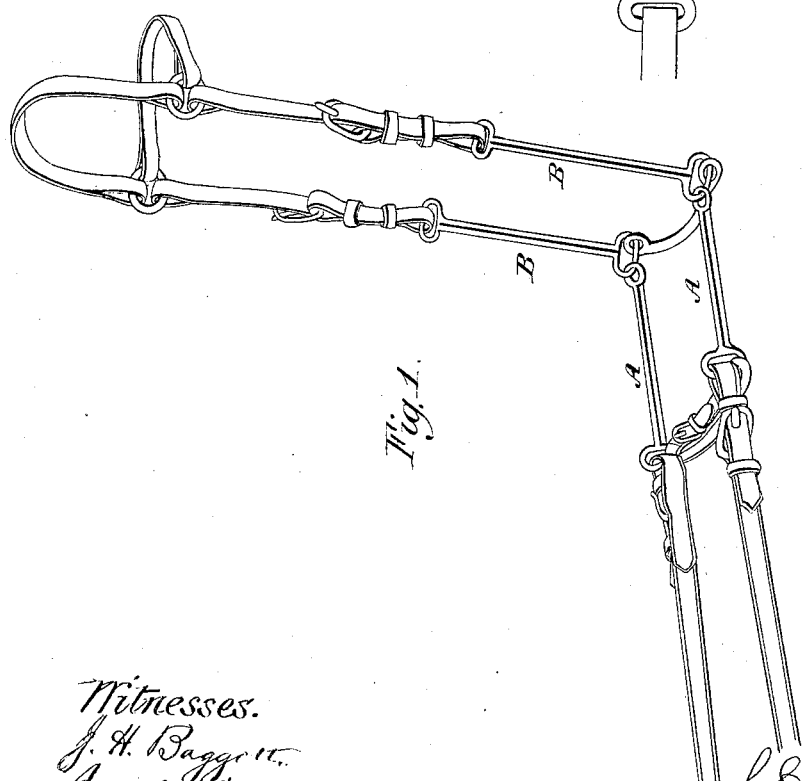
Figure 1 represents my improved bit complete.

The object of my invention is to furnish a bridle-bit which will enable the rider or driver to govern stubborn horses with ease, and prevent them from turning to the right or left, except as directed; and my invention consists in the combination of four bars of iron or other metal directly with the mouth-piece without the interposition of a ring or rings.

The bars A A are connected by loops in their ends with the bars B B, which are in like manner connected to the mouth-piece $a$. The head-stall buckles into the upper ends of the bars B B, and the reins are connected to the ends of the bars A A. These bars A A are connected together by a strap, which may be shortened or lengthened by means of a buckle. The mouth-piece may be either jointed or rigid, and the bars A and B are made rigid also, but must be connected directly to the bit or mouth-piece by joints, as represented in the drawings. In using my improved bit, the under jaw of the horse is placed within the surrounding, consisting of the strap $d$, mouth-piece $a$, and bars A A; and by means of a strap, provided with a buckle, the bars A A may be adjusted to fit closely to the under jaw, or left more loosely, as may be required. The bars A and B may be several inches long. My improved bit will effectually govern the horse and guide him in the direction desired, because of its capability of compressing between the bars and mouth-piece either side of the animal's jaw; and under all conditions the two bars A A retain their parallel position, or nearly so. When it is desired to rein a stubborn horse to the right or left, by pulling upon the rein the bit will assume an elongated form diagonally, and thereby clamp and compress the jaw at that side of the animal's mouth at which the mouth-piece and one of the bars A will form an acute angle. Bits of this construction cannot be drawn through the animal's mouth; but by the means of the rigid bars and their connections, the animal may be "wielded," as it were, and completely controlled by the rider or driver. By varying the length of the strap under the lower jaw, the compression may be given at any desired point on the mouth or jaw of the horse.

Having fully described my improvements in bridle-bits, what I claim, and desire to secure by Letters Patent, is—

The combination of the rigid bars A and B, jointed directly to the mouth-piece of a bridle-bit, and operating in the manner substantially as and for the purpose described.

L. D. WOODMANSEE.

Witnesses:
   J. H. BAGGOTT,
   JNO. C. BAGGOTT.